US010929644B2

(12) United States Patent
Wang et al.

(10) Patent No.: US 10,929,644 B2
(45) Date of Patent: Feb. 23, 2021

(54) FACE DETECTION TRAINING METHOD AND APPARATUS, AND ELECTRONIC DEVICE

(71) Applicant: TENCENT TECHNOLOGY (SHENZHEN) COMPANY LIMITED, Shenzhen (CN)

(72) Inventors: Hao Wang, Shenzhen (CN); Zhifeng Li, Shenzhen (CN); Xing Ji, Shenzhen (CN); Fan Jia, Shenzhen (CN); Yitong Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 122 days.

(21) Appl. No.: 16/392,270

(22) Filed: Apr. 23, 2019

(65) Prior Publication Data

US 2019/0251333 A1 Aug. 15, 2019

Related U.S. Application Data

(63) Continuation of application No. PCT/CN2018/079281, filed on Mar. 16, 2018.

(30) Foreign Application Priority Data

Jun. 2, 2017 (CN) .......................... 201710406726.9

(51) Int. Cl.
  *G06K 9/00* (2006.01)
  *G06K 9/62* (2006.01)
  (Continued)

(52) U.S. Cl.
  CPC .......... *G06K 9/00228* (2013.01); *G06K 9/00* (2013.01); *G06K 9/00288* (2013.01); *G06K 9/36* (2013.01);
  (Continued)

(58) Field of Classification Search
  None
  See application file for complete search history.

(56) References Cited

U.S. PATENT DOCUMENTS 6,466,685 B1 * 10/2002 Fukui ................. G06K 9/00288
 382/115
2007/0002321 A1 * 1/2007 Desfonds ............. G01M 11/337
 356/367

(Continued)

FOREIGN PATENT DOCUMENTS

CN 101231702 A 7/2008
CN 102663370 A 9/2012
(Continued)

OTHER PUBLICATIONS

Japanese Office Action dated Aug. 11, 2020 in Japanese Application No. 2019-525952, with English translation, citing documents AX-AZ 6 pgs.

(Continued)

*Primary Examiner* — Hadi Akhavannik
(74) *Attorney, Agent, or Firm* — Oblon, McClelland, Maier & Neustadt, L.L.P.

(57) ABSTRACT

An object detection training method can include receiving a training sample set in a current iteration of an object detection training process over an object detection neural network. The training sample set can include first samples of a first class and second samples of a second class. A first center loss value of each of the first and second samples can be determined. The first center loss value can be a distance between an eigenvector of the respective sample and a center eigenvector of the first or second class which the respective sample belongs to. A second center loss value of the training sample set can be determined according to the first center loss values of the first and second samples. A first (Continued)

target loss value of the current iteration can be determined according to the second center loss value of the training sample set.

20 Claims, 6 Drawing Sheets

(51) Int. Cl.
    *G06N 3/02*         (2006.01)
    *G06K 9/46*         (2006.01)
    *G06K 9/36*         (2006.01)

(52) U.S. Cl.
    CPC ................ *G06K 9/46* (2013.01); *G06K 9/62* (2013.01); *G06K 9/6256* (2013.01); *G06K 9/6262* (2013.01); *G06K 9/6284* (2013.01); *G06N 3/02* (2013.01)

(56) References Cited

U.S. PATENT DOCUMENTS

| | | | |
|---|---|---|---|
| 2013/0223756 A1* | 8/2013 | Iketani | H04N 1/393 382/260 |
| 2015/0312550 A1* | 10/2015 | Robert | H04N 13/271 348/46 |
| 2017/0046563 A1 | 2/2017 | Kim et al. | |

FOREIGN PATENT DOCUMENTS

| | | |
|---|---|---|
| CN | 104063865 A | 9/2014 |
| CN | 104680121 A | 6/2015 |
| CN | 106682734 A | 5/2017 |

OTHER PUBLICATIONS

Kaipeng Zhang, et al. Joint Face Detection and Alignment Using Mult itask Cascaded Convolutional Networks IEEE Signal Processing Letters, 2016, vol. 23 No. 10, pp. 1499-1503,URL, https://ieeexplore.ieee.org/document/7553523.

Shimeng Yang, et al., A light and discriminative deep networks for off-line handwritten Chinese character recognition,2017 32nd Youth Academic Annual Conference of Chinese Association of Automation May 21, 2017, pp. 785-790, URL, https://ieeexplore.ieee.org/document/7967516.

Shaoqing Ren, et al. Faster R-CNN: Towards Real-Time Object Detection with Region Proposal Networks, IEEE Transactions on Pattern Analysis and Machine Intelligence, 2016, vol. 39 No. 6, pp. 1137-1149, URL , https://ieeexplore.ieee.org/document/7485869.

Written Opinion and International Search Report dated May 31, 2018 in PCT/CN2018/079281 with concise English translation citing documents AA, AO-AS therein.

\* cited by examiner

FACE DETECTION TRAINING METHOD AND APPARATUS, AND ELECTRONIC DEVICE

RELATED APPLICATION

This application is a continuation of International Application No. PCT/CN2018/079281, filed on Mar. 16, 2018, which claims priority to Chinese Patent Application No. 201710406726.9, filed on Jun. 2, 2017. The entire disclosures of the prior applications are hereby incorporated by reference in their entirety.

FIELD OF THE TECHNOLOGY

The present disclosure relates to the field of image processing technologies.

BACKGROUND OF THE DISCLOSURE

Face detection is a technology in which a face detector is used to detect a face from an image. Quality of face detection training directly affects face detection performance. Therefore, how to optimize a face detection training process is a researching focus of researchers.

With the development of deep learning, convolutional neural network (CNN)-based face detection training has become a mainstream face detection training method. For example, face detection training is performed by using a Faster Region-based convolutional neural network (Faster RCNN). A CNN-based face detection training process mainly includes: constructing a face detection model, performing iterative training with training samples, to update network parameters of the face detection model in each iteration, thereby optimizing the face detection training. The process of updating network parameters of the face detection model in each iteration may be considered as a face detection optimization process.

The goal of face detection optimization is to maximize a difference between a face and a non-face (i.e., maximizing an inter-class difference). Less attention is paid to a difference between faces (or an intra-class difference), resulting in a poor identification capability and poor face detection robustness while dealing with face variations in different scenarios.

SUMMARY

An object detection training method can include receiving, by processing circuitry, a training sample set in a current iteration of an object detection training process over an object detection neural network. The training sample set can include first samples of a first class and second samples of a second class. A first center loss value of each of the first and second samples can be determined. The first center loss value can be a distance between an eigenvector of the respective sample and a center eigenvector of the first or second class which the respective sample belongs to. The eigenvector of the respective sample can be generated during the current iteration. The center eigenvector of the first or second class can be derived based on the eigenvectors of the first samples or the second samples, respectively. A second center loss value of the training sample set can be determined according to the first center loss values of the first and second samples. A first target loss value of the current iteration can be determined according to the second center loss value of the training sample set. An object detection training result is output when the first target loss value of the current iteration reaches a convergence condition.

An apparatus of object detection training can include circuitry configured to receive a training sample set in a current iteration of an object detection training process over an object detection neural network. The training sample set can include first samples of a first class and second samples of a second class. A first center loss value of each of the first and second samples can be determined. The first center loss value can be a distance between an eigenvector of the respective sample and a center eigenvector of the first or second class which the respective sample belongs to. The eigenvector of the respective sample can be generated during the current iteration. The center eigenvector of the first or second class can be derived based on the eigenvectors of the first samples or the second samples, respectively. A second center loss value of the training sample set can be determined according to the first center loss values of the first and second samples. A first target loss value of the current iteration can be determined according to the second center loss value of the training sample set. An object detection training result is output when the first target loss value of the current iteration reaches a convergence condition.

A non-transitory computer-readable medium can store a program executable by a processor to perform the object detection training method.

BRIEF DESCRIPTION OF THE DRAWINGS

To describe the technical solutions in the embodiments of the present disclosure or in the related technology more clearly, the following briefly describes the accompanying drawings for describing the embodiments or the related technology. The accompanying drawings in the following description show merely embodiments of the present disclosure, and a person of ordinary skill in the art may still derive other drawings from these accompanying drawings.

DESCRIPTION OF EMBODIMENTS

The following describes the technical solutions in the embodiments of the present disclosure with reference to the accompanying drawings in the embodiments of the present disclosure. The described embodiments are only some embodiments instead of all embodiments of the present disclosure. All other embodiments obtained by a person of ordinary skill in the art based on the embodiments of the present disclosure shall fall within the protection scope of the present disclosure.

Figure 1:
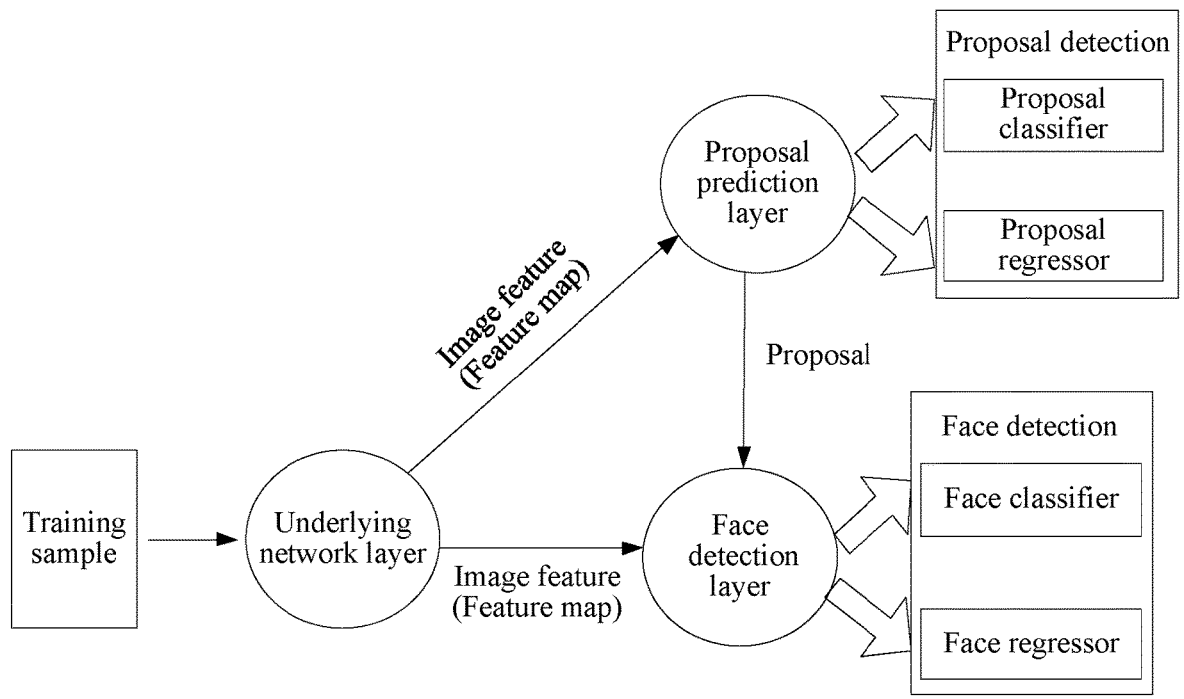
FIG. 1 shows a structure of a face detection model.

An optional face detection model constructed based on convolutional neural networks (CNNs) in the embodiments of the present disclosure may be shown in FIG. 1, and includes an underlying network layer, a proposal prediction layer, and a face detection layer.

The underlying network layer may be a subnet formed by sequentially connecting a series of convolution layers and pooling layers. The underlying network layer may perform convolution processing on each training sample (where the training sample may be a sample in a form of an image) layer by layer by using a series of convolution layers. A current convolution layer performs convolution processing on a convolution processing result output from a previous convolution layer. Herein, for features of an image processed by a plurality of convolution layers, a shallow layer feature can represent rich features such as edge points and textured structures, a deep layer feature is a further abstract mapping based on the shallow layer feature. According to the layer-by-layer convolution processing using a plurality of convolution layers, image features of different layers can be extracted. For each training sample, the underlying network layer outputs a feature map through convolution processing using the last layer, and the feature map may be a representation of the image feature.

The proposal prediction layer may be a subnet having a full convolution structure, and is established based on the image feature output by the underlying network layer. The proposal prediction layer may map a feature of each training sample by using the convolution layers, thereby building a proposal classifier and a proposal regressor by using mapping nodes, to implement proposal detection. The proposal classifier may be used for predicting a proposal probability, and the proposal regressor may be used for predicting proposal coordinates, so as to output a proposal. The proposal output by the proposal prediction layer may be input to the face detection layer. For example, the proposals can be candidate bounding boxes of detected faces.

The face detection layer may be a subnet including region of interest pooling layers (RoI Pooling), and is established based on the image feature output by the underlying network layer and the proposal output by the proposal prediction layer. For each training sample, the face detection layer may perform, based on the proposal, dimension-reducing sampling on the image feature that is of the training sample and that is output by the underlying network layer, to obtain a feature map having a fixed size. All nodes in the feature map are connected and mapped to an eigenvector having a fixed length, so as to obtain an eigenvector of each training sample. A face classifier and a face regressor are built based on each training sample. The face classifier and the face regressor jointly implement face detection. The face classifier can predict a probability of a face and a non-face, and the face regressor may perform more accurate face-box coordinate regression based on the proposal.

Figure 2:
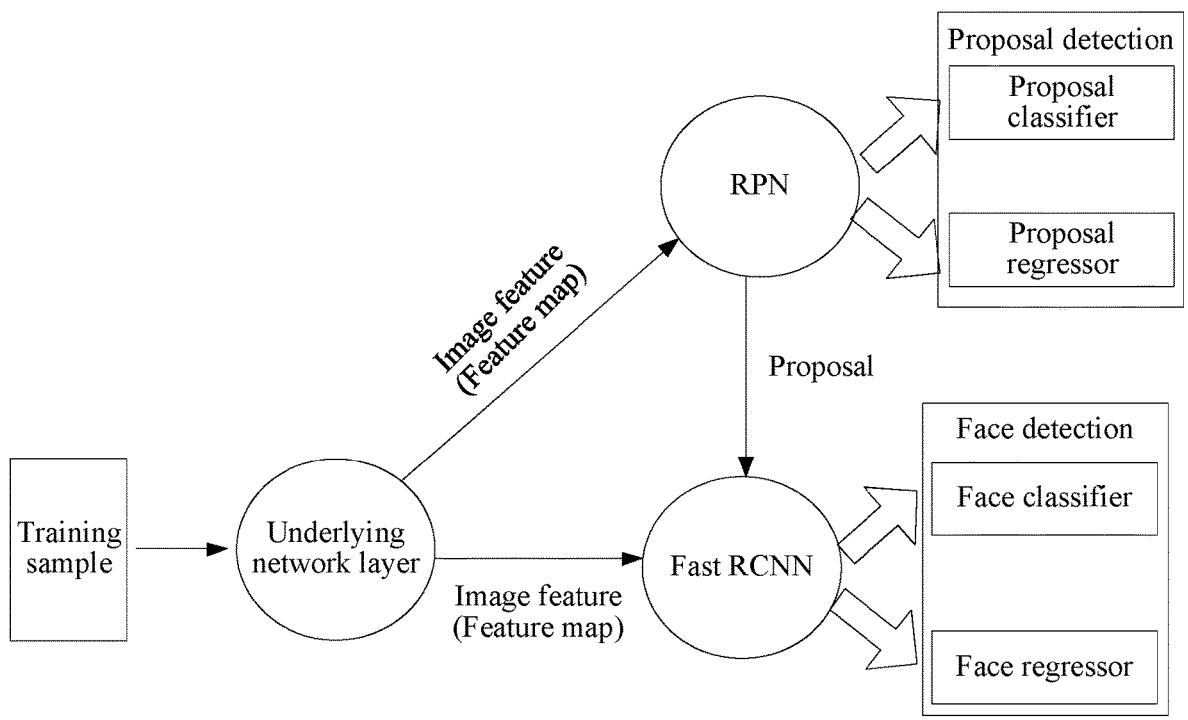
FIG. 2 shows another structure of a face detection model.

Further, as shown in FIG. 2, the face detection module may be implemented using a Faster RCNN-based face detection model. The Faster RCNN is an algorithm for face detection, and can be divided into a Region Proposal Network (RPN) layer and a Fast RCNN layer. The RPN layer generates a proposal, and the Fast RCNN layer may obtain a final detection result based on the proposal.

As shown in FIG. 2, the face detection module based on the Faster RCNN may include an underlying network layer, an RPN layer, and a Fast RCNN layer. The RPN layer may be considered as an implementation of the proposal prediction layer, and the Fast RCNN layer may be considered as an implementation of the face detection layer.

In the embodiments of the present disclosure, a goal of the RPN layer is to generate a proposal based on image features output by the underlying network layer. In this process, in the embodiments of the present disclosure, a plurality of anchor boxes may be predefined, and the plurality of anchor boxes cover can have different sizes and aspect ratios. Sub-boxes in a training sample may be determined by using the predefined plurality of anchor boxes, and the proposal is predicted by using the sub-boxes (for example, proposal detection may be trained by using the sub-boxes, and subsequently be used to predict the proposal).

For example, the anchor boxes can be used for defining and establishing a classifier and a regressor in the RPN layer for generating the proposal (e.g. candidate face bounding boxes). Specifically, each anchor box is associated with a detection (classification and regression), and the classification and the regression can be trained and learned by using a predicted value and a target value. In the RPN, determination of a target classification value (e.g., whether to define the output as a positive class or a negative class) is based on an overlapping rate of the anchor box and a true box. Similarly, in the Fast RCNN, a target classification value is determined according to an overlapping rate of the proposal and the true box. Therefore, the anchor box used in the RPN and the proposal used in the Fast RCNN have similar functions when the classifier is built, and the anchor box may be considered as a candidate of the proposal. In the RPN, a plurality of proposal detections (each proposal detection is associated with one anchor box) may be established for each node obtained after convolution processing is performed on an image feature.

A goal of the Fast RCNN layer is to generate an eigenvector of a training sample based on the proposal (proposed box) and the image feature output by the underlying network layer, so that a face classifier and a face regressor are built by using the eigenvector of the training sample. The face classifier and the face regressor jointly implement the face detection.

To enable the face detection to have a better detection performance, iterative training may be performed by using a model optimization algorithm such as a stochastic gradient descent (SGD) algorithm. In each iteration, batch data training samples are selected from a training sample set to perform training, and then in each iteration, network parameters of a face detection model is updated depending on whether a face detection optimization target is realized.

In some related technologies, maximizing a difference between a face and a non-face is mainly used as the face detection optimization target, and a face change difference (face variations) between faces in different scenarios is ignored, for example, face change differences in different scenarios such as different photographing angles, resolutions, lighting conditions, expression changes, and blocking are ignored, leading to a poor identification capability and poor face detection robustness. For example, if a difference between intra-class faces (for example, with lighting and without lighting) is excessively large, it is identified that the faces are different classes. However, the faces actually should be of a same class. Therefore, in the embodiments of the present disclosure, errors caused by intra-class differences can be minimized, thereby ensuring an invariant intra-class difference in the face detection.

Accordingly, the embodiments of the present disclosure improve an optimization process of face detection iterative training, and provide a new face detection training method. The new method can be used to reduce errors of intra-class differences between faces and improve an identification capability in the face detection while ensuring that the face detection has higher performance of detecting a face and a non-face.

The face detection training method provided in the embodiments of the present disclosure may be loaded, in a program form, onto an electronic device configured to implement face detection training. The electronic device may be a terminal device such as a network side server or a user-side personal computer (PC). A form of the electronic device may be determined depending on an actual training requirement on the face detection.

Figure 3:
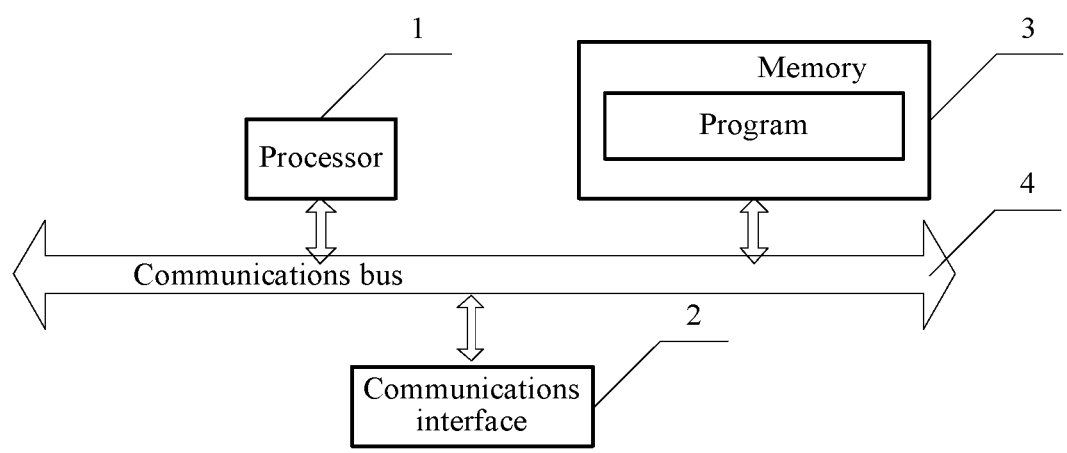
FIG. 3 is a block diagram of a hardware structure of an electronic device.

In an embodiment, a hardware structure of the electronic device configured to implement the face detection training may be shown in FIG. 3, and includes processing circuitry such as one processor 1, a communications interface 2, a memory 3, and a communications bus 4.

In the embodiments of the present disclosure, there are at least one processor 1, communications interface 2, memory 3, and communications bus 4, and the processor 1, the communications interface 2, and the memory 3 may communicate with each other by using the communications bus 4. A schematic communication connection between the processor 1, the communications interface 2, the memory 3, and the communications bus 4 shown in FIG. 3 is merely optional.

The communications interface 2 may be an interface of a communications module, for example, an interface of a GSM module.

The processor 1 may be a central processing unit (CPU) or an application-specific integrated circuit (ASIC), or may be configured as one or more integrated circuits for implementing the embodiments of the present disclosure.

The memory 3 may include non-transitory media such as a high-speed RAM memory, may also include, for example, at least one magnetic disk memory.

The memory 3 stores a program, the processor 1 invokes the program stored in the memory 3, and the program may be used for implementing the face detection training method provided in the embodiments of the present disclosure.

In the embodiments of the present disclosure, iterative face detection training may be performed by using a model optimization algorithm such as a stochastic gradient descent (SGD) algorithm. The SGD is a convolutional neural network optimization algorithm, and is effective for resolving a large-scale machine learning problem. In each iteration using the SGD, gradient descent optimization is performed by using a batch data training sample (Minibatch) extracted randomly from a training sample set.

Figure 4:
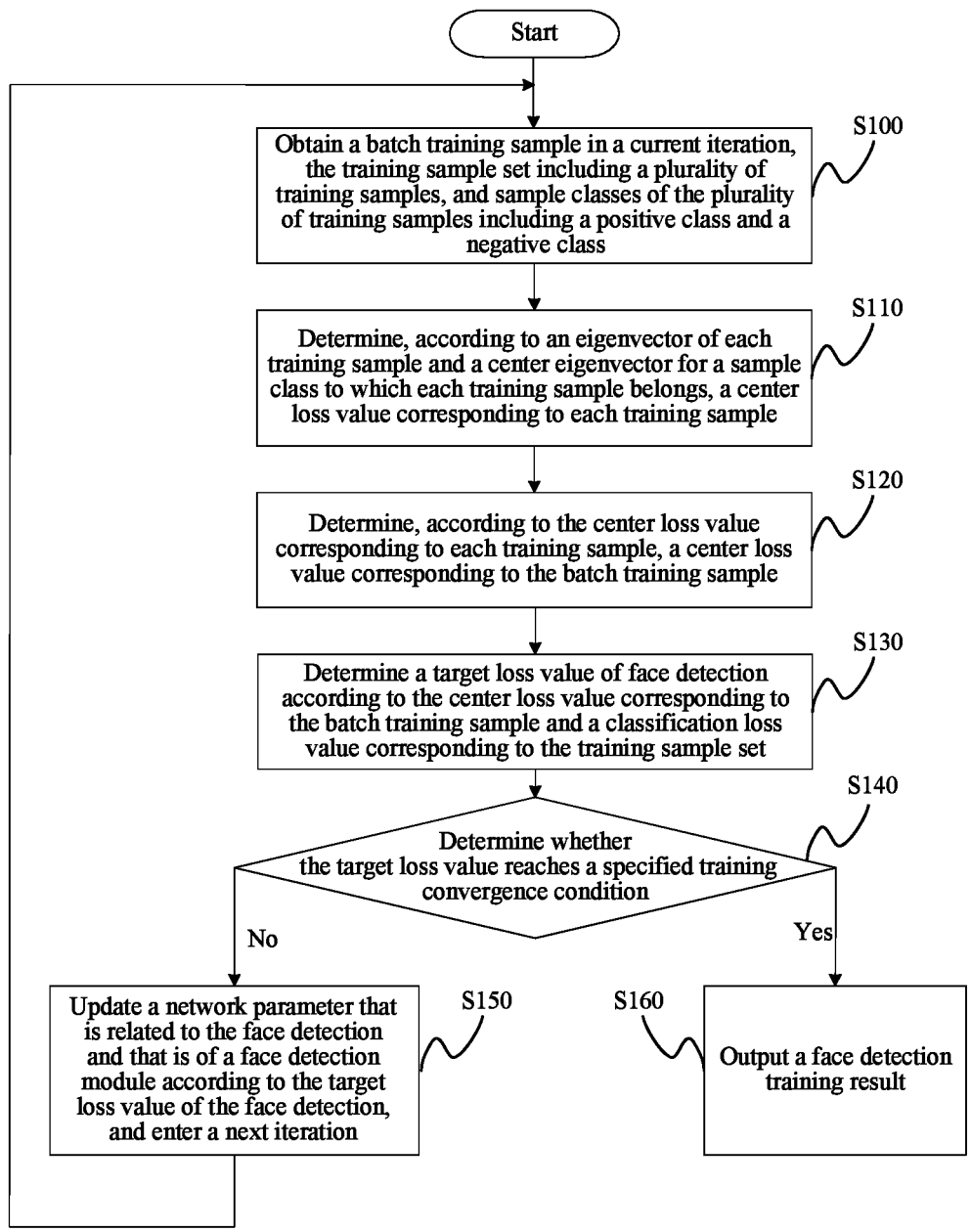
FIG. 4 is a flowchart of a face detection training method according to an embodiment of the present disclosure.

Using face detection training in one iteration as an example, a procedure of the face detection training method provided in the embodiments of the present disclosure may be shown FIG. 4. It is noted that while face detection is used as an example in the disclosure, neural networks and training techniques disclosed herein are not limited to face detection, and can be applied to detection of any object. For a face detection training procedure in each iteration, refer to FIG. 4. As shown in FIG. 4, the face detection training method provided in the embodiments of the present disclosure may include the following steps.

Step S100. Obtain a batch data training sample in a current iteration The batch data training samples can include g a plurality of training samples of different sample classes. For example, a training sample can be an image or a picture in a video that includes a to-be-detected object, such as a human face.

Optionally, the batch data training sample (Minibatch) is selected from a training sample set including all training samples.

Face detection may be considered as a two-class task (a face and a non-face). In each iteration, a plurality of face images may be obtained from the training sample set and used as training samples of a positive class, and a plurality of non-face images may be obtained and used as training samples of a negative class. The obtained training samples of the positive class and the obtained training samples of the negative class constitute a batch data training sample in each iteration.

Correspondingly, the batch data training sample used in the current iteration may include a plurality of training samples. Sample classes of the plurality of training samples may be classified into a positive class (i.e., the positive class of training samples corresponding to the face images) and a negative class (i.e., the negative class of training samples corresponding to the non-face images).

Step S110. Determine, according to an eigenvector of each training sample and a center eigenvector for a sample class to which each training sample belongs, a center loss value corresponding to each training sample.

For a training sample in the batch data training sample, in the embodiments of the present disclosure, an eigenvector of the training sample and a center eigenvector that corresponds to a sample class to which the training sample belongs in the batch data training sample may be determined, thereby determining a center loss value corresponding to the training sample. Processing may be performed on each training sample in the batch data training sample, to obtain a center loss value corresponding to each training sample in the batch data training sample.

For example, a center eigenvector for a sample class in the batch data training sample may be correspondingly updated by using an average value of eigenvectors of training samples belonging to the sample class in the batch data training sample in the current iteration.

For example, for a sample class, in the embodiments of the present disclosure, each training sample belonging to the sample class in the batch data training sample may be determined; an average value of eigenvectors of training samples that are in the batch data training sample and that belong to the sample class is determined according to the eigenvectors of the training samples belonging to the sample class, to obtain an update variable of a center eigenvector for the sample class in the batch data training sample; and the center eigenvector for the sample class in the batch data training sample is obtained according to the update variable and a specified learning rate. In this way, a center eigenvector for a sample class is updated according to an average value of eigenvectors of training samples that are in the batch data training sample and that belong to the sample class.

For example, in the embodiments of the present disclosure, a center eigenvector for a sample class in the batch data training sample may be determined according to the following formula:

$$C_j^{t+1} = C_j^t - \alpha \Delta C_j^t,$$

where α representing a specified learning rate, $\Delta C_j^t$ representing an update variable, $C_j^t$ representing a center eigenvector corresponding to a batch data training sample used for a $j^{th}$ sample class in a $t^{th}$ iteration, and $C_j^{t+1}$ representing a center eigenvector corresponding to a batch data training sample used for the $j^{th}$ sample class in a $(t+1)^{th}$ iteration.

In an example, for a sample class, in the embodiments of the present disclosure, a center eigenvector that corresponds to t-th batch data training sample in the sample class in the current iteration may be obtained by subtracting a product of the update variable and the specified learning rate from a center eigenvector that corresponds to a batch data training sample in the sample class in a previous iteration.

In an example, for a positive sample class in the batch data training sample, in the embodiments of the present disclosure, eigenvectors of training samples belonging to the positive class in the batch data training sample may be determined, and an average value of the eigenvectors of the training samples belonging to the positive class may be determined, to update a center eigenvector of the positive sample class. Correspondingly, for a negative sample class in the batch data training sample, in the embodiments of the present disclosure, eigenvectors of training samples belonging to the negative class in the batch data training sample may be determined, and an average value of the eigenvectors of the training samples belonging to the negative class may be determined, to update a center eigenvector of the negative sample class.

For each training sample of the positive class in the batch data training sample, in the embodiments of the present disclosure, a center loss value corresponding to each training sample of the positive class may be determined according to an eigenvector of each training sample of the positive class and the center eigenvector of the positive sample class. For each training sample of the negative class in the batch data training sample, in the embodiments of the present disclosure, a center loss value corresponding to each training sample of the negative class may be determined according to an eigenvector of each training sample of the negative class and the center eigenvector of the negative sample class.

For example, a center loss value of a training sample may be represented by using a distance between an eigenvector of the training sample and a center eigenvector for a sample class to which the training sample belongs. It is assumed that $x_i$ represents an eigenvector of the $i^{th}$ training sample in the batch data training sample, $y_i$ represents a sample class to which $x_i$ belongs (it may be set that $y_i=1$ represents a positive class and $y_i=0$ represents a negative class, or certainly, it may be set that $y_i=0$ represents a negative class and $y_i=1$ represents a positive class, provided that values of $y_i$ corresponding to the positive and negative classes are different), $c_{yi}$ represents a center eigenvector for the sample class $y_i$ to which $x_i$ belongs, and a center loss value of the sample $x_i$ may be defined as $\|x_i - c_{yi}\|_2^2$.

It is noted that a process of determining an eigenvector of a training sample may be as follows: After an underlying network layer outputs an image feature of the training sample, a face detection layer determines, according to a proposal, a region of interest in the training sample. The face detection layer performs dimension-reducing sampling on the image feature in the region of interest in the training sample to obtain a feature map having a fixed size. All nodes on the feature map are connected and mapped to an eigenvector having a fixed length, to obtain the eigenvector of the training sample.

Step S120. Determine, according to the center loss value corresponding to each training sample, a center loss value corresponding to the batch data training sample.

For example, in the embodiments of the present disclosure, an average value of center loss values corresponding to the training samples may be determined according to the center loss values corresponding to the training samples, and the center loss value corresponding to the batch data training sample may be determined according to the average value of the center loss values corresponding to the training samples.

For example, in the embodiments of the present disclosure, an average value of center loss values corresponding to the training samples may be used as the center loss value corresponding to the batch data training sample. Alternatively, an average value of center loss values corresponding to the training samples may be multiplied by a specified value (a coefficient, for example, by ½) to obtain the center loss value corresponding to the batch data training sample.

It is assumed that the batch data training sample has a total of m training samples. The center loss value corresponding to the batch data training sample may be represented as $$\frac{1}{2} \sum_{i=1}^{m} \|x_i - c_{yi}\|_2^2.$$

Step S130. Determine a target loss value of face detection according to at least the center loss value corresponding to the batch data training sample.

The target loss value of the face detection is a representation of an optimization target of an iterative face detection training process. When the target loss value reaches a specified training convergence condition (for example, a minimum value, or a value smaller than a threshold value)), the iterative training may be terminated, and the face detection training results may be output. In each iteration, in the embodiments of the present disclosure, a related face detection optimization target may be combined with the center loss value corresponding to the used batch data training sample, to serve as a face detection optimization target in the embodiments of the present disclosure, thereby obtaining the target loss value of the face detection.

For example, in the embodiments of the present disclosure, the target loss value of the face detection may be determined according to the center loss value corresponding to the batch data training sample, a classification loss value corresponding to the batch data training sample, and a face box coordinate regression loss value corresponding to the batch data training sample.

The classification loss value corresponding to the batch data training sample may be determined according to a difference between a predicted classification probability and a target classification probability (a true classification probability) of each training sample in the batch data training sample.

For each training sample in the batch data training sample, after an eigenvector of the training sample is obtained, in the embodiments of the present disclosure, a sample class to which the training sample belongs may be predicted by using a Softmax function or the like, to obtain a predicted classification probability of the training sample. In this way, a classification loss value corresponding to the training sample (for example, a difference between the predicted classification probability and a target classification probability of the training sample is taken) may be determined according to the predicted classification probability of the training sample and the true target classification probability of the training sample, thereby determining the classification loss value corresponding to the batch data training sample (for example, an average value of classification loss values of the training samples like is taken) according to the classification loss value corresponding to each training sample in the batch data training sample.

Accordingly, the classification loss value corresponding to the batch data training sample is an indicator for inter-class classification between a face and a non-face in the face detection. The classification loss value corresponding to the batch data training sample may represent or be associated with a difference between a face and a non-face (an inter-class difference). The classification loss value corresponding to the batch data training sample is used as a part of the face detection optimization target, so that optimized face detection of a face and a non-face has higher inter-class distinguishing performance.

As described above, the center loss value corresponding to the batch data training sample represents a distance between an eigenvector of a training sample and a center eigenvector for a sample class to which the training sample belongs. Therefore, the center loss value corresponding to the batch data training sample can explain a difference between an eigenvector of a training sample and a center eigenvector for a sample class to which the training sample belongs, and can represent an intra-class eigenvector difference between training samples of each sample class. In this way, the center loss value corresponding to the batch data training sample is used as a part of the face detection optimization target, so that the optimized face detection can have a stable performance regardless of the intra-class differences between faces (for example, an intra-class difference between faces in different scenarios) and face detection robustness can be enhanced.

In various embodiments, the face detection training may include classification training and regression training, and is a joint training process. A loss value including a center loss value and a classification loss value corresponding to a batch data training sample in an iteration may be considered as a classification training optimization target. For example, minimizing the loss value including the center loss value and the classification loss value corresponding to the batch data training sample is used as the classification training optimization target in the face detection training.

In each iteration, a regression training optimization target in the face detection training may be formed by a face box coordinate regression loss value corresponding to a batch data training sample.

The target loss value of the face detection may be formed by combining a center loss value, a classification loss value, and a face box coordinate regression loss value corresponding to a batch data training sample in an iteration, to represent a face detection training optimization target.

For example, in the embodiments of the present disclosure, a product of the center loss value corresponding to the batch data training sample and a first specified weight, a product of the face box coordinate regression loss value corresponding to the batch data training sample and a second specified weight, and the classification loss value corresponding to the batch data training sample are summed, to obtain the target loss value of the face detection.

Assuming that $L_{cls}$ represents the classification loss value corresponding to the batch data training sample, $L_c$ represents the center loss value corresponding to the batch data training sample, and $L_{reg}$ represents the face box coordinate regression loss value corresponding the to batch data training sample, the target loss value of the face detection may be represented as $L_{cls}+\mu L_c+\lambda L_{reg}$, $\mu$ and $\lambda$ representing specified weight coefficients, $\mu$ being a first specified weight, and $\lambda$ being a second specified weight.

In the embodiments of the present disclosure, alternatively, the center loss value, the classification loss value, and the face box coordinate regression loss value corresponding to the batch data training sample may be summed to obtain the target loss value of the face detection.

Step S140. Determine whether the target loss value of the face detection reaches a specified training convergence condition; if the determination result is positive, perform step S150; and otherwise, perform step S160.

For example, the specified training convergence condition may be considered as that the target loss value of the face detection is minimized, or is smaller than or equal to a threshold value.

For example, a smaller classification loss value corresponding to the batch data training sample indicates a better performance of the face detection during classification of a face and a non-face, and the face detection can distinguish a difference between a face and a non-face to a greatest extent (maximizing performance of detection of inter-class differences). A smaller center loss value corresponding to the batch data training sample indicates a smaller intra-class eigenvector difference between training samples of each sample class, so that a difference between training samples of a same sample class is reduced, thereby reducing a difference between faces in the sample class. For example, through iterative training, a distance between an eigenvector of each training sample in the batch data training sample and a center eigenvector for a sample class to which the training sample belongs is minimized.

As shown, the target loss value of the face detection is determined by using the center loss value corresponding to the batch data training sample, and then the training convergence condition is determined by using the target loss value of the face detection. In this way, when the center loss value corresponding to the batch data training sample is minimized in the face detection, an intra-class difference between faces (for example, an intra-class difference between faces in different scenarios) is invariant in the face detection irrespective face variations in different scenarios, and face detection robustness is enhanced.

Step S150. Update network parameters that are related to the face detection and that is of a face detection module according to the target loss value of the face detection, enter a next iteration, and return to step S100.

For example, if the target loss value of the face detection does not reach the specified training convergence condition (for example, if the target loss value of the face detection does not reach a minimum value), in the embodiments of the present disclosure, the network parameter of the face detection module may be updated according to the target loss value of the face detection. In addition, the next iteration is performed and step S100 is returned according to an iterative training procedure, to cyclically perform step S100 to step S140 by using the face detection model with the updated network parameters, until a determining result in step S140 is that the target loss value of the face detection reaches the specified training convergence condition.

For example, in the embodiments of the present disclosure, the next iteration may be entered and step S100 may be returned by using a stochastic gradient descent method.

Step S160. Output the face detection training results.

For example, if the target loss value of the face detection reaches the specified training convergence condition (for example, if the target loss value of the face detection reaches a minimum value), the face detection training results obtained through training by using the face detection module may be output, to complete the process of optimizing the iterative face detection training.

The face detection training procedure provided in the embodiments of the present disclosure may include: obtaining a batch data training sample in a current iteration, the batch data training sample including a plurality of training samples of different sample classes; determining, according to an eigenvector of each training sample and a center eigenvector for a sample class to which each training sample belongs, a center loss value corresponding to each training sample; determining, according to the center loss value corresponding to each training sample, a center loss value corresponding to the batch data training sample; determining a target loss value of face detection according to at least the center loss value corresponding to the batch data training sample; if the target loss value of the face detection does not reach a specified training convergence condition, updating a network parameter of a face detection module according to the target loss value of the face detection, and entering a next iteration until the target loss value of the face detection reaches the specified training convergence condition; and outputting the face detection if the target loss value of the face detection reaches the specified training convergence condition, to complete face detection training.

In the embodiments of the present disclosure, the face detection training optimization target is combined with the center loss value corresponding to the batch data training sample, so that an intra-class difference between faces is invariant in the face detection. Therefore, according to optimized face detection training performed in combination with the center loss value corresponding to the batch data training sample, an intra-class difference between faces is invariant in optimized and trained face detection and face detection robustness is enhanced while ensuring higher inter-class detection performance for a face and non-face.

Optionally, when the network parameter of the face detection model is updated according to the target loss value of the face detection, in the embodiments of the present disclosure, the network parameters of the face detection module may be updated through back propagation according to the target loss value of the face detection.

Optionally, in the embodiments of the present disclosure, a parameter update value of the face detection may be determined according to the target loss value of the face detection and a network parameter of the face detection model in a previous iteration, so as to update the network parameter of the face detection model in the previous iteration according to the parameter update value of the face detection.

Optionally, assuming that the target loss value of the face detection is Loss, Loss=$L_{ls}$+μ$L_c$+λ$L_{reg}$, and the network parameter of the face detection module in the previous iteration is W1, the parameter update value of the face detection may be represented as:

$$\Delta W = \frac{\partial \text{Loss}}{\partial W1}.$$

The updating the network parameter of the face detection module in the previous iteration according to the parameter update value of the face detection may be implemented by using the following formula:

$$W2=kW1-\alpha(\Delta W+sW1)$$

W2 being an updated network parameter of the face detection module, k being momentum, α being a learning rate, and s being a weight decay coefficient.

Figure 5:
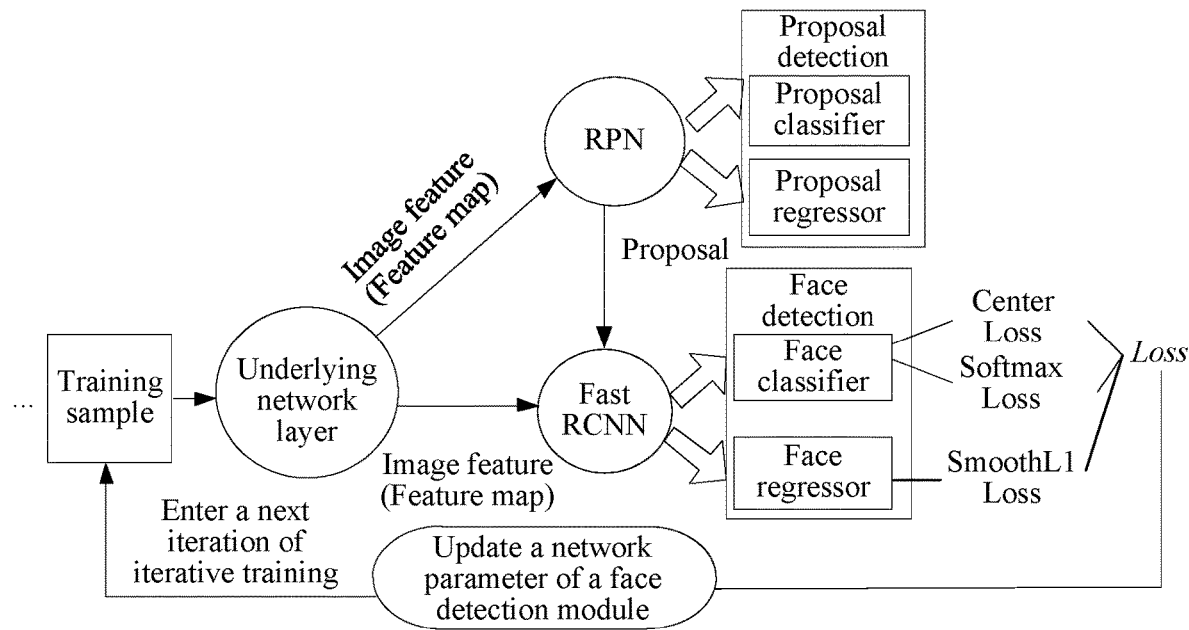
FIG. 5 is a schematic diagram of face detection training based on a face detection model.

In an embodiment, as shown in FIG. 5, a center loss function (Center Loss) may be set on a face detection layer (for example, a Fast RCNN layer). The center loss function may function on a full-connection feature presentation layer of the face detection layer. The full-connection feature presentation layer may connect and map, in a form of a full connection, all nodes in a feature map to an eigenvector having a fixed length, to obtain an eigenvector of each training sample. In this way, in each time of iterative training, a center loss value corresponding to each training sample in the batch data training sample may be determined by using the center loss function according to an eigenvector of each training sample in the batch data training sample used in the current iteration, and the center loss value $L_c$ corresponding to the batch data training sample is correspondingly determined.

In addition, a Softmax function may be set on the face detection layer (for example, a Fast RCNN layer). The Softmax function may function on the full-connection feature presentation layer of the face detection layer. During each time of training of the iterative training, the Softmax function may be used to process the eigenvector of each training sample, to determine a predicted classification probability of each training sample. Then, a difference between a predicted classification probability of a training sample and a target classification probability (a true classification probability) is represented by using a Softmax Loss (a classification loss function), and the classification loss value $L_{cls}$ corresponding to the batch data training sample is determined.

For example, an input of the Softmax function is an eigenvector of a training sample, and an output is a predicted probability that the training sample belongs to each sample class. The Softmax Loss (the classification loss function) inputs p (the predicted classification probability) and p* (the target classification probability) of the training sample, and outputs a loss value (Loss), a smaller Loss indicating more accurate classification. In the embodiments of the present disclosure, the Center Loss and the Softmax Loss function on a same layer (that is, input eigenvectors are the same). The Center Loss is used as a secondary supervision signal in the face detection optimization, and a smaller Center Loss indicates a smaller difference between intra-class features detected in the face detection. The Softmax Loss drives inter-class features detected in the face detection to be separate from each other, thereby ensuring a distinguishable inter-class difference.

Further, in an embodiment, a face box regression prediction function SmoothL1 (a smoothL1 norm function) may be set on the face detection layer (for example, the Fast RCNN layer). Predicted face box coordinates corresponding to each training sample in the batch data training sample are determined based on a proposal by using the SmoothL1. Then, a face box coordinate regression loss value corresponding to each training sample is determined by using a SmoothL1 Loss. An input of the SmoothL1 Loss is predicted face box coordinates and target face box coordinates corresponding to the training sample, and an output is a loss value (Loss).

Further, based on this, the face box coordinate regression loss value $L_{reg}$ corresponding to the batch data training sample is determined.

In the embodiments of the present disclosure, it may be determined that the target loss value of the face detection is Loss=$L_{ls}$+$\mu L_c$+$\lambda L_{reg}$. The network parameter of the face detection module is updated by using the target loss value Loss obtained in each iteration, until the target loss value Loss reaches a minimum value.

In an iteration, a process of determining the classification loss value corresponding to the batch data training sample may be as follows:

determining a classification loss value corresponding to each training sample in the batch data training sample according to a predicted classification probability and a target classification probability that are corresponding to each training sample in the batch data training sample; and determining the classification loss value corresponding to the batch data training sample according to the classification loss value corresponding to each training sample in the batch data training sample.

Figure 6:
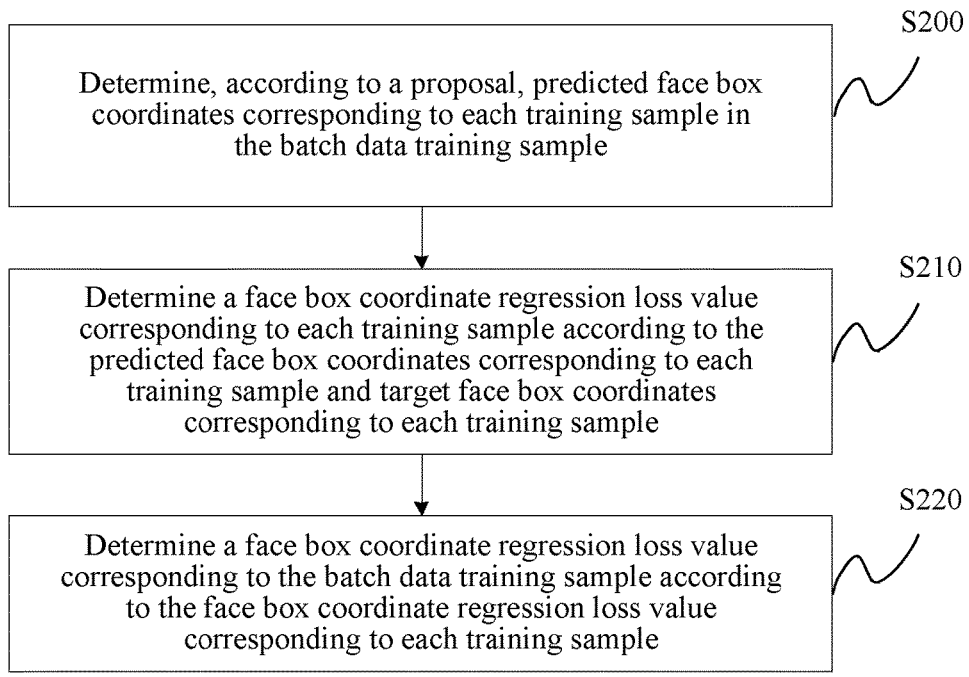
FIG. 6 is a flowchart of a method for determining a face box coordinate regression loss value.

Iin an iteration, a process of determining the face box coordinate regression loss value corresponding to the batch data training sample may be shown in FIG. 6, and includes the following steps:

Step S200. Determine, according to a proposal, predicted face box coordinates corresponding to each training sample in the batch data training sample.

For example, in the embodiments of the present disclosure, a region of interest of each training sample in the batch data training sample in a current iteration may be determined according to a proposal output by a proposal prediction layer, to obtain predicted face box coordinates corresponding to each training sample. Predicted face box coordinates of a training sample may be represented by using horizontal and vertical coordinates of an upper-left vertex and horizontal and vertical coordinates of a lower-right vertex.

A face box regression prediction function SmoothL1 (a smoothL1 norm function) may be set on a face detection layer (for example, a Fast RCNN layer), and predicted face box coordinates corresponding to each training sample are determined based on the proposal by using the SmoothL1.

Step S210. Determine a face box coordinate regression loss value corresponding to each training sample according to the predicted face box coordinates corresponding to each training sample and target face box coordinates corresponding to each training sample.

For example, target face box coordinates corresponding to a training sample may be true coordinates corresponding to a face box in the training sample. For each training sample, in the embodiments of the present disclosure, a difference between predicted face box coordinates corresponding to the training sample and target face box coordinates corresponding to the training sample may be used to determine a face box coordinate regression loss value corresponding to the training sample. In this way, processing is performed on each training sample to obtain the face box coordinate regression loss value corresponding to each training sample.

For example, in the embodiments of the present disclosure, the face box coordinate regression loss value may be represented by a SmoothL1 Loss. An input of the SmoothL1 Loss is the predicted face box coordinates and the target face box coordinates corresponding to the training sample, and an output is a loss value (Loss), a smaller Loss indicating more accurate face box regression.

Step S220. Determine a face box coordinate regression loss value corresponding to the batch data training sample according to the face box coordinate regression loss value corresponding to each training sample.

For example, in the embodiments of the present disclosure, an average value of face box coordinate regression loss values corresponding to the training samples may be determined according to the face box coordinate regression loss value corresponding to each training sample in the batch data training sample, and the face box coordinate regression loss value (SmoothL1 Loss) corresponding to the batch data training sample is determined according to the average value.

As described above, in the embodiments of the present disclosure, joint multi-loss function training is performed in the iterative face detection training process, including two joint tasks: face classification and regression. The classification training is optimized jointly by using a Center Loss and a Softmax Loss, and the regression training is optimized by using the SmoothL1 Loss. A final face detection optimization target is minimizing a weighted sum of three loss values, the Center Loss, the Softmax Loss, and the SmoothL1 Loss, corresponding to the batch data training sample.

In addition, in the embodiments of the present disclosure, finetuning may be performed on a model pre-trained in a large-scale face recognition task (ImageNet). The center loss value is introduced as a secondary optimization target of the face detection, to guide optimization and training of the face detection module, and to improve a capability of identifying an intra-class difference between faces in the face detection.

In an iterative training process, in the embodiments of the present disclosure, a training sample that is in the training sample set and that is relatively difficult to detect in the face detection may be determined based on a face detection model in a previous iteration, to determine a batch data training sample to be used in a next iteration, so as to strengthen a capability of detecting such training samples that are relatively difficult to detect in the face detection. Whether a training sample is relatively difficult to detect may be determined by measuring a target loss value corresponding to the training sample. For example, a larger target loss value indicates a longer distance between the training sample and the optimization target, and accordingly, a larger detection difficulty.

Figure 7:
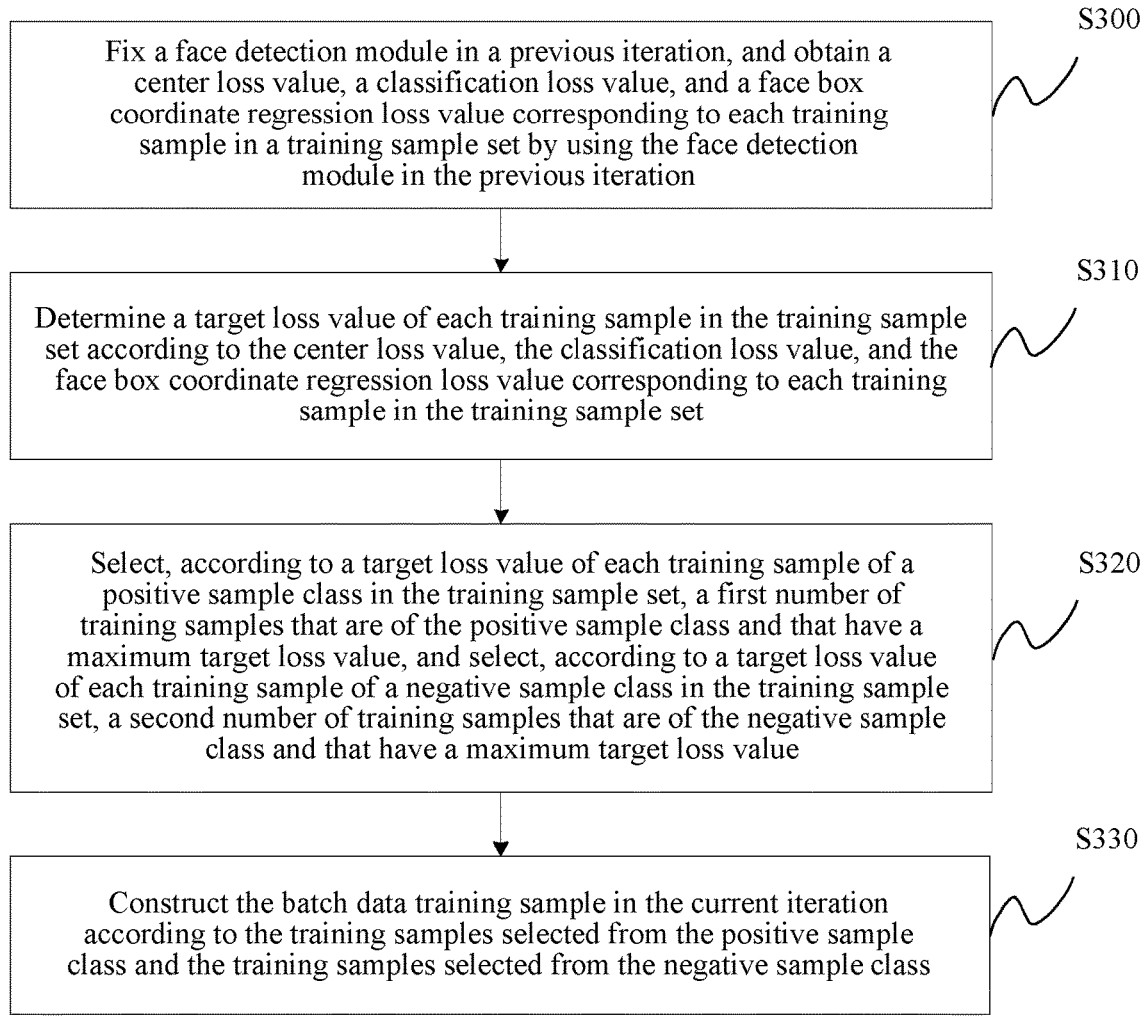
FIG. 7 is a flowchart of a method for obtaining a batch data training sample.

Accordingly, FIG. 7 is a flowchart of a method for obtaining the batch data training sample in the current iteration according to an embodiment of the present disclosure. Referring to FIG. 7, the method may include the following steps:

Step S300. Obtain a center loss value, a classification loss value, and a face box coordinate regression loss value corresponding to each training sample in the training sample set in the previous iteration of the face detection model.

Step S310. Determine the target loss value of each training sample in the training sample set according to the center loss value, the classification loss value, and the face box coordinate regression loss value corresponding to each training sample in the training sample set.

For example, for each training sample, in this embodiment of the present disclosure, a weighed sum of a center loss value, a classification loss value, and a face box coordinate regression loss value of the training sample may be calculated, to obtain a target loss value of the training sample. Processing may be performed on each training sample to obtain the target loss value of each training sample.

For example, for a training sample, a target loss value of the training sample may be represented as: classification loss value+μ center loss value+λ face box coordinate regression loss value.

Alternatively, for a training sample, in this embodiment of the present disclosure, a center loss value, a classification loss value, and a face box coordinate regression loss value of the training sample may be summed to obtain a target loss value of the training sample.

Step S320. Select, according to the target loss values of each training sample of a positive sample class in the training sample set, a first number of training samples that are of the positive sample class and that have maximum target loss values, and select, according to a target loss values of each training sample of a negative sample class in the training sample set, a second number of training samples that are of the negative sample class and that have maximum target loss values. A ratio of the first number to the second number can be a predetermined ratio.

For example, after obtaining the target loss value of each training sample in the training sample set, in this embodiment of the present disclosure, the training samples in the training sample set may be classified according to positive and negative classes. Subsequently, a target loss value of each training sample belonging to a positive sample class in the training sample set and a target loss value of each training sample belonging to a negative sample class in the training sample set can be determined. In addition, the training samples belonging to the positive class may be sorted (which may be in descending order of the target loss values or in ascending order of the target loss values) according to the target loss value of each training sample of the positive sample class, and the training samples belonging to the negative class may be sorted according to the target loss value of each training sample of the negative sample class.

Further, according to a specified ratio of a number of the training samples of the positive class to a number of the training samples of the negative class in the batch data training sample, the first number of training samples that are of the positive sample class and that have maximum target loss values are selected according to the target loss value of each training sample of the positive sample class in the training sample set, and the second number of training samples that are of the negative sample class and that have maximum target loss values are selected according to the target loss value of each training sample of the negative sample class in the training sample set. A ratio of the first number to the second number can correspond to the specified ratio of the number of the samples of the positive class to the number of the samples of the negative class in the batch data training sample.

For example, considering a data balance condition of the Center Loss for a positive sample (a face) and a negative sample (a non-face), in this embodiment of the present disclosure, the specified ratio may be set to 1:1, that is, the first number is the same as the second number.

Step S330. Construct the batch data training sample in the current iteration according to the training samples selected from the positive sample class and the training samples selected from the negative sample class.

Accordingly, in the face detection training method provided in the embodiments of the present disclosure, after a batch data training sample in a previous iteration is sent to the face detection module for training, face detection may be updated and optimized according to a Center Loss and a Softmax Loss of the batch data training sample in the previous iteration, and a face regressor is updated and optimized according to a SmoothL1 Loss of the batch data training sample in the previous iteration, so that the face detection is optimized toward a direction of minimizing a weighted sum of the Center Loss, the Softmax Loss, and the SmoothL1 Loss.

A batch data training sample used in a next iteration may be determined according to the previous iteration. A target loss value of a Center Loss, a Softmax Loss, and a SmoothL1 Loss of each training sample in the training sample set may be determined by using a face detection module obtained after the previous iteration, thereby selecting, from the training sample set, the first number of training samples that are of the positive class and that have maximum target loss values and the second number of training samples that are of the negative class and that have maximum target loss values, to construct a Minibatch (that is, the batch data training sample) in the next iteration.

In this way, the next iteration is entered. In the next iteration, the Minibatch is sent to the face detection module for training, thereby cyclically and iteratively performing training, until a weighted sum of a Center Loss, a Softmax Loss, and a SmoothL1 Loss of the batch data training sample reaches a minimum value in an iteration.

In the foregoing described process, a training sample that is relatively difficult to detect (e.g. referred to as a hard sample, or hard example) in face detection obtained after training in the previous iteration is used as the Minibatch to be used in the next iteration, so that a Center Loss can be better estimated in each iteration, thereby better supervising and learning a feature of the training sample having intra-class difference identifiability. Such a process is a type of as online hard example mining (OHEM) algorithm.

It is noted herein that, different from related iterative face detection training using a stochastic gradient descent algorithm, in this embodiment of the present disclosure, gradient descent optimization is performed not by simply using a randomly selected batch data training sample (Minibatch). Instead, the Minibatch used in the next iteration is determined in combination with the training samples that are relatively difficult to detect in the training sample set in the previous iteration.

As described herein, the embodiments of the present disclosure provide a robust face detection training method. The method is implemented based on a neural network. In each training process in the iterative training, a Center Loss (a center loss value) that corresponds to a batch data training sample is used as a secondary loss function of a face-non-face two-class task. The Center Loss is combined with a Softmax Loss (a classification loss value) corresponding to the batch data training sample to jointly supervise optimized training of the face detection. A learning process of the face detection can thus be guided by the combined loss function. As a result, an intra-class difference is reduced and a capability of identifying a face in the face detection is improved while an inter-class difference between a face and a non-face in the face detection.

In addition, an online hard example mining (OHEM) algorithm is used to mine, according to a total loss value of training samples, training samples of a positive class and training samples of a negative class that are relatively difficult to detect in the previous training. A ratio of a number of positive samples to a number of negative samples can be configured to be 1:1, thereby enhancing a capability of classifying a training sample that is relatively difficult to detect in the face detection, and improving the overall performance of the face detection.

In addition, in the present disclosure, anchor boxes (covering a plurality of sizes and a plurality of aspect ratios) more suitable for a face target and a multiscale training policy are used to improve identifiability for face targets having different resolutions, so that generation of a proposal is applicable to different faces.

The face detection trained by using the face detection training method provided in the embodiments of the present disclosure can effectively improve accuracy and enhance robustness. Performance comparison between the face detection in the embodiments of the present disclosure and face detection trained with other methods may be shown in Table 1:

TABLE 1

| Method | Recall rate (in a case of 2000 false detections) |
|---|---|
| Faster RCNN | 0.9720 |
| Faster RCNN + OHEM | 0.9745 |
| Faster RCNN + OHEM + Center Loss (data used in the embodiments of the present disclosure) | 0.9781 |

As shown in Table 1, the embodiments of the present disclosure can improve a capability of identifying faces in the face detection and enhance face detection robustness.

The following describes a face detection training apparatus provided in the embodiments of the present disclosure. Content of the face detection training apparatus described below may be considered as program modules set in an electronic device configured to implement face detection training, to implement the face detection training method provided in the embodiments of the present disclosure. The content of the face detection training apparatus described below and the content of the face detection training method described above may be referenced between each other.

Figure 8:
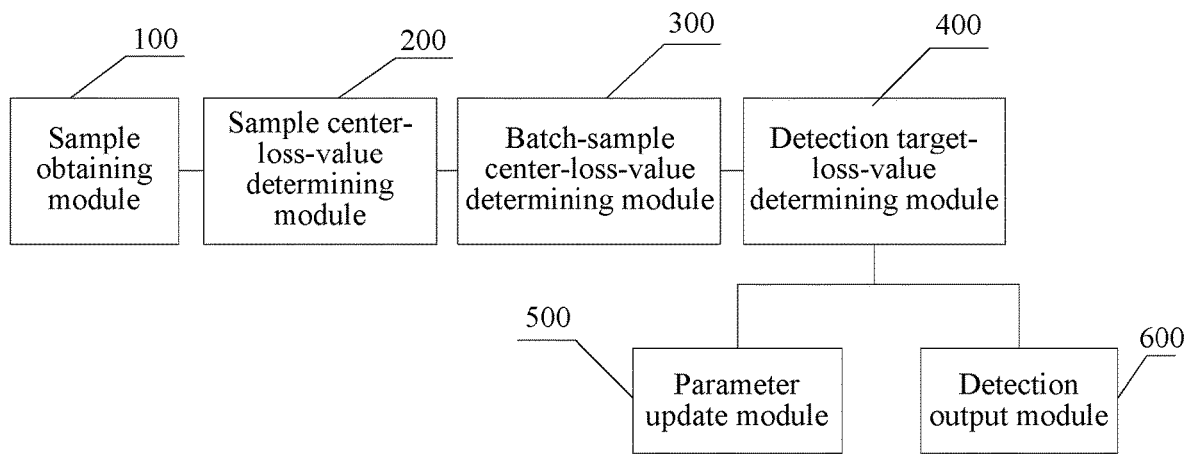
FIG. 8 is a structural block diagram of a face detection training apparatus according to an embodiment of the present disclosure.

FIG. 8 is a structural block diagram of a face detection training apparatus according to an embodiment of the present disclosure. Referring to FIG. 8, the face detection training apparatus may include:

a sample obtaining module 100, configured to obtain a batch data training sample in a current iteration, the batch data training sample including a plurality of training samples of different sample classes;

a sample center-loss-value determining module 200, configured to determine, according to an eigenvector of each training sample and a center eigenvector for a sample class to which each training sample belongs, a center loss value corresponding to each training sample;

a batch-sample center-loss-value determining module 300, configured to determine, according to the center loss value corresponding to each training sample, a center loss value corresponding to the batch data training sample;

a detection target-loss-value determining module 400, configured to determine a target loss value of face detection according to the center loss value corresponding to the batch data training sample; and a parameter update module 500, configured to: if the target loss value of the face detection does not reach a specified training convergence condition, update a network parameter of a face detection module according to the target loss value of the face detection, and enter a next iteration; and a detection output module 600, configured to output the face detection if the target loss value of the face detection reaches the specified training convergence condition.

For example, the detection target-loss-value determining module 400 is configured to:

determine the target loss value of the face detection according to the center loss value corresponding to the batch data training sample, a classification loss value corresponding to the batch data training sample, and a face box coordinate regression loss value corresponding to the batch data training sample.

For example, the detection target-loss-value determining module 400 is configured to:

sum a product of the center loss value corresponding to the batch data training sample and a first specified weight, a product of the face box coordinate regression loss value corresponding to the batch data training sample and a second specified weight, and the classification loss value corresponding to the batch data training sample, to obtain the target loss value of the face detection.

For example, the sample obtaining module 100 is configured to:

determine a target loss value corresponding to each training sample in a training sample set by using a face detection module in a previous iteration;

select, according to a target loss value of each training sample of a positive sample class in the training sample set, a first number of training samples that are of the positive sample class and that have a maximum target loss value, and selecting, according to a target loss value of each training sample of a negative sample class in the training sample set, a second number of training samples that are of the negative sample class and that have a maximum target loss value, a ratio of the first number to the second number corresponding to a specified ratio; and construct a batch data training sample in a current iteration according to the training samples selected from the positive sample class and the training samples selected from the negative sample class.

For example, the sample obtaining module 100 is configured to:

obtain a center loss value, a classification loss value, and a face box coordinate regression loss value corresponding to each training sample in the training sample set by using the face detection module in the previous iteration, a classification loss value corresponding to a training sample being determined according to a predicted classification probability and a target classification probability that are corresponding to the training sample, and a face box coordinate regression loss value corresponding to a training sample being determined according to predicted face box coordinates and target face box coordinates that are corresponding to the training sample; and determine the target loss value of each training sample in the training sample set according to the center loss value, the classification loss value, and the face box coordinate regression loss value corresponding to each training sample in the training sample set.

Figure 9:
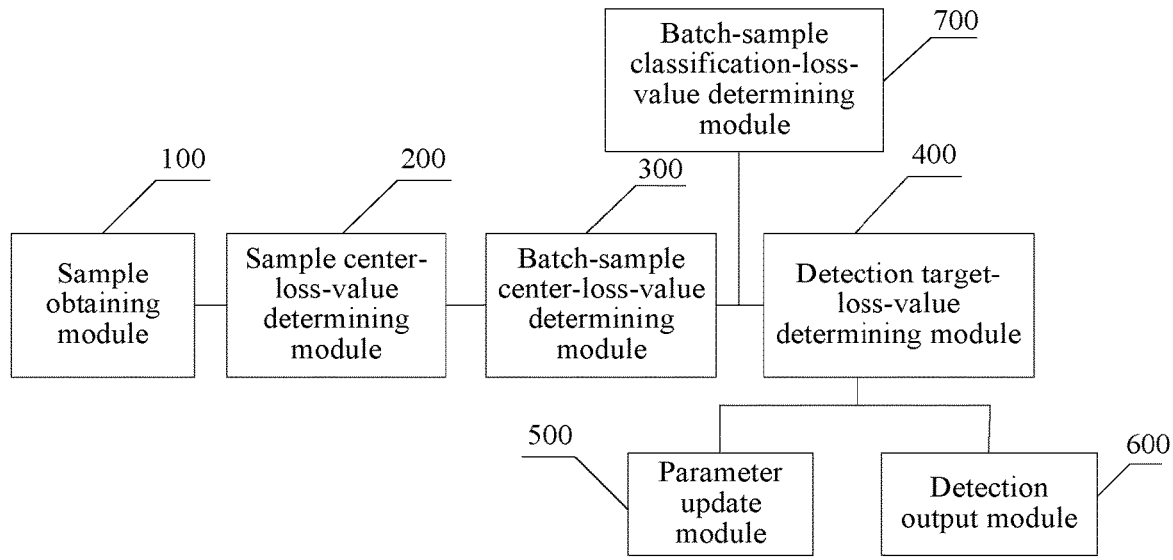
FIG. 9 is another structural block diagram of a face detection training apparatus according to an embodiment of the present disclosure.

For example, FIG. 9 is another structural block diagram of the face detection training apparatus according to an embodiment of the present disclosure. With reference to FIG. 8 and FIG. 9, the face detection training apparatus may further include:

a batch-sample classification-loss-value determining module 700, configured to: determine a classification loss value corresponding to each training sample in the batch data training sample according to a predicted classification probability and a target classification probability that are corresponding to each training sample in the batch data training sample; and determine the classification loss value corresponding to the batch data training sample according to the classification loss value corresponding to each training sample in the batch data training sample.

For example, the sample center-loss-value determining module 200 is configured to:

determine an eigenvector of each training sample in the batch data training sample and a center eigenvector of each sample class in the batch data training sample; and for a training sample in the batch data training sample, determine a distance between an eigenvector of the training sample and a center eigenvector for a sample class to which the training sample in the batch data training sample belongs, to obtain a center loss value corresponding to the training sample.

For example, the sample center-loss-value determining module 200 is configured to:

for a sample class, determine training samples that are in the batch data training sample and that belong to the sample class;

determine, according to eigenvectors of the training samples that are in the batch data training sample and that belong to the sample class, an average value of the eigenvectors of the training samples belonging to the sample class, to obtain an update variable of a center eigenvector for the sample class in the batch data training sample; and obtain the center eigenvector for the sample class in the batch data training sample according to the update variable and a specified learning rate.

Figure 10:
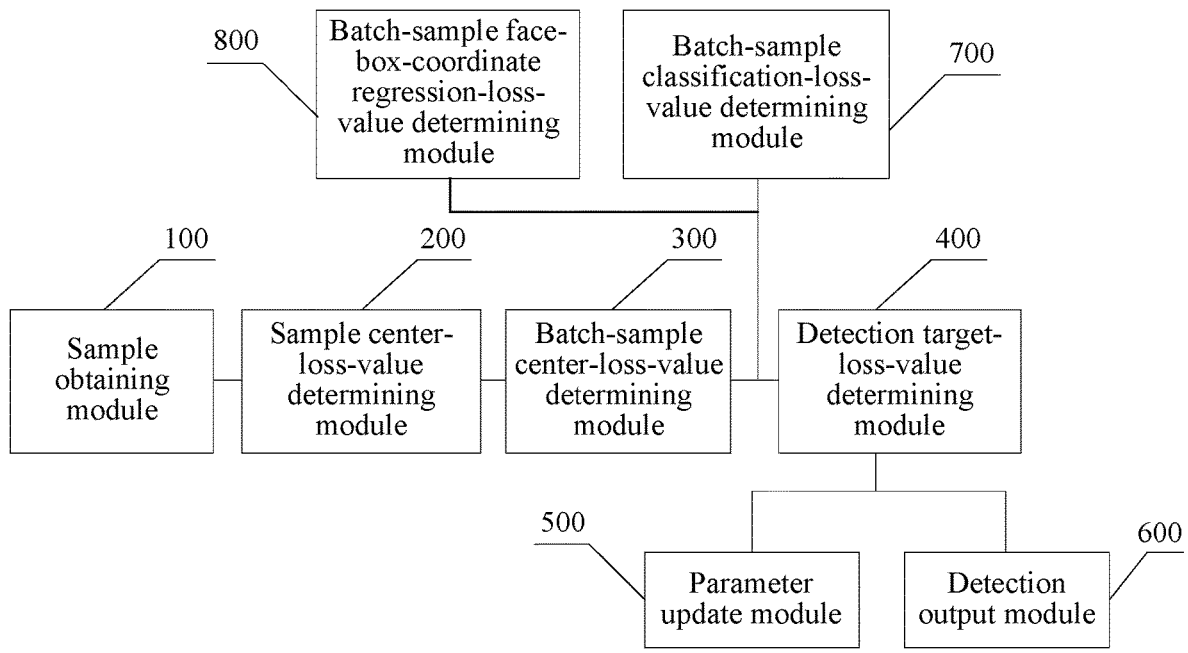
FIG. 10 is still another structural block diagram of a face detection training apparatus according to an embodiment of the present disclosure.

For example, FIG. 10 is still another structural block diagram of the face detection training apparatus according to an embodiment of the present disclosure. With reference to FIG. 9 and FIG. 10, the face detection training apparatus may further include:

a batch-sample face-box-coordinate regression-loss-value determining module 800, configured to: determine predicted face box coordinates corresponding to each training sample in the batch data training sample according to a proposal regressor; determine a face box coordinate regression loss value corresponding to each training sample according to the predicted face box coordinates corresponding to each training sample and target face box coordinates corresponding to each training sample; and determine the face box coordinate regression loss value corresponding to the batch data training sample according to the face box coordinate regression loss value corresponding to each training sample.

For example, the parameter update module 500 is configured to:

update the network parameter of the face detection module through back propagation according to the target loss value of the face detection.

For example, the parameter update module 500 is configured to:

determine a parameter update value of the face detection according to the target loss value of the face detection and a network parameter of a face detection module in a previous iteration; and update the network parameter of the face detection module in the previous iteration according to the parameter update value of the face detection.

For example, the face detection training apparatus provided in this embodiment of the present disclosure may be further configured to:

predefine a plurality of anchor boxes, the plurality of anchor boxes covering different scales and aspect ratios; and determine a sub-box in the training sample by using the predefined plurality of anchor boxes, and predicting a proposal by using the sub-box.

An embodiment of the present disclosure further provides an electronic device. A hardware structure of the electronic device may be shown in FIG. 3, and includes at least one memory and at least one processor.

The memory stores a program, the processor invokes the program, and the program is used for:

obtaining a batch data training sample in a current iteration, the batch data training sample including a plurality of training samples of different sample classes;

determining, according to an eigenvector of each training sample and a center eigenvector for a sample class to which each training sample belongs, a center loss value corresponding to each training sample;

determining, according to the center loss value corresponding to each training sample, a center loss value corresponding to the batch data training sample;

determining a target loss value of face detection according to at least the center loss value corresponding to the batch data training sample;

if the target loss value of the face detection does not reach a specified training convergence condition, updating a network parameter of a face detection module according to the target loss value of the face detection, and entering a next iteration; and outputting a face detection training result if the target loss value of the face detection reaches the specified training convergence condition.

It is noted that the embodiments in this specification are all described in a progressive manner. Description of each of the embodiments focuses on differences from other embodiments, and reference may be made to each other for the same or similar parts among respective embodiments. The apparatus embodiments are substantially similar to the method embodiments and therefore are only briefly described, and reference may be made to the method embodiments for the associated part.

Persons skilled in the art may further realize that, in combination with the embodiments herein, units and algorithm, steps of each example described can be implemented with electronic hardware, computer software, or the combination thereof. In order to clearly describe the interchangeability between the hardware and the software, compositions and steps of each example have been generally described according to functions in the foregoing descriptions. Whether the functions are executed in a mode of hardware or software depends on particular applications and design constraint conditions of the technical solutions. Persons skilled in the art can use different methods to implement the described functions for each particular application, but it should not be considered that the implementation goes beyond the scope of the embodiments of the present disclosure.

In combination with the embodiments herein, steps of the method or algorithm described may be directly implemented using hardware, a software module executed by a processor, or the combination thereof. The software module may be placed in a random access memory (RAM), a memory, a read-only memory (ROM), an electrically programmable ROM (EPROM), an electrically erasable programmable ROM (EEPROM), a register, a hard disk, a removable magnetic disk, a CD-ROM, or any storage medium of other forms well-known in the technical field.

The above description of the disclosed embodiments enables persons skilled in the art to implement or use the present disclosure. Various modifications to these embodiments are obvious to persons skilled in the art, the general principles defined in the present disclosure may be implemented in other embodiments without departing from the core idea or scope of the present disclosure. Therefore, the present disclosure is not limited to these embodiments illustrated in the present disclosure, but needs to conform to the broadest scope consistent with the principles and novel features disclosed in the present disclosure.

What is claimed is:

1. An object detection training method, comprising:
receiving, by processing circuitry, a training sample set in a current iteration of an object detection training process over an object detection neural network, the training sample set including first samples of a first class and second samples of a second class;
determining, by the processing circuitry, a first center loss value of each of the first and second samples, the first center loss value being a distance between an eigenvector of the respective sample and a center eigenvector of the first or second class which the respective sample belongs to, the eigenvector of the respective sample being generated during the current iteration, the center eigenvector of the first or second class being derived based on the eigenvectors of the first samples or the second samples, respectively;
determining, by the processing circuitry, a second center loss value of the training sample set according to the first center loss values of the first and second samples;
determining, by the processing circuitry, a first target loss value of the current iteration according to the second center loss value of the training sample set; and
outputting, by the processing circuitry, an object detection training result when the first target loss value of the current iteration reaches a convergence condition.

2. The object detection training method according to claim 1, further comprising:
when the first target loss value of the current iteration does not reach the convergence condition, updating a network parameter of the object detection neural network according to the first target loss value of the current iteration.

3. The object detection training method according to claim 1, wherein the determining the first target loss value comprises:
determining the first target loss value according to the second center loss value, a first classification loss value, and a first object box coordinate regression loss value of the training sample set.

4. The object detection training method according to claim 3, wherein the determining the first target loss value comprises:
summing a product of the second center loss value of the training sample set and a first weight, a product of the first object box coordinate regression loss value of the training sample set and a second specified weight, and the first classification loss value of the training sample set to obtain the first target loss value of the object detection.

5. The object detection training method according to claim 1, further comprising:
determining a second target loss value of each of the first and second samples in the training sample set;
selecting a first number of the first samples that have maximum second target loss values among the first samples, and a second number of the second samples that have maximum second loss values among the second samples, a ratio of the first number to the second number being a predetermined ratio; and
including the first number of the first samples and the second number of the second samples in an object detection training sample set for a next iteration of the object detection training process.

6. The object detection training method according to claim 5, wherein the determining the second target loss value of each of the first and second samples in the training sample set comprises:
determining a second classification loss value according to a predicted classification probability and a target classification probability of a third sample of the first and second samples;
determining a second object box coordinate regression loss value according to predicted object box coordinates and target object box coordinates of the third sample; and
determining the second target loss value of the third sample according to the first center loss value, the second classification loss value, and the second object box coordinate regression loss value of the third sample.

7. The object detection training method according to claim 3, further comprising:
determining a second classification loss value of each of the first and second samples in the training sample set according to a predicted classification probability and a target classification probability of the respective sample; and
determining the first classification loss value of the training sample set according to the second classification loss values of the first and second samples.

8. The object detection training method according to claim 3, further comprising:
determining predicted object box coordinates of each of the first and second samples in the training sample set;
determining a second object box coordinate regression loss value corresponding to each of the first and second samples in the training sample set according to the predicted object box coordinates and target object box coordinates of each of the first and second samples in the training sample set; and
determining the first object box coordinate regression loss value of the training sample set according to the second object box coordinate regression loss values of the first and second samples.

9. The object detection training method according to claim 1, further comprising:
determining an update variable of the center eigenvector of the first class according to an average of the eigenvectors of the first samples; and
determining the center eigenvector of the first class of the current iteration by updating a center eigenvector of the first class of a previous iteration with a product of the update variable and a learning rate.

10. The object detection training method according to claim 2, wherein the updating the network parameter comprises:
updating the network parameter through a back propagation according to the first target loss value of the current iteration.

11. The object detection training method according to claim 10, wherein the updating the network parameter through the back propagation comprises:
determining a parameter update value according to the first target loss value and a prior network parameter in a previous iteration; and updating the prior network parameter in the previous iteration according to the parameter update value to obtain an updated network parameter.

12. The object detection training method according to claim 1, further comprising:
    applying, at a proposal prediction layer of the object detection neural network, a plurality of anchor boxes to a region in one of the first or second samples, the region corresponding to a node in a feature map of the one of the first or second samples, the plurality of anchor boxes having different sizes and aspect ratios; and
    determining a candidate box based on the plurality of anchor boxes.

13. An apparatus of object detection training, comprising circuitry configured to:
    receive a training sample set in a current iteration of an object detection training process over an object detection neural network, the training sample set including first samples of a first class and second samples of a second class;
    determine a first center loss value of each of the first and second samples, the first center loss value being a distance between an eigenvector of the respective sample and a center eigenvector of the first or second class which the respective sample belongs to, the eigenvector of the respective sample being generated during the current iteration, the center eigenvector of the first or second class being derived based on the eigenvectors of the first samples or the second samples, respectively;
    determine a second center loss value of the training sample set according to the first center loss values of the first and second samples;
    determine a first target loss value of the current iteration according to the second center loss value of the training sample set; and
    output an object detection training result when the first target loss value of the current iteration reaches a convergence condition.

14. A non-transitory computer-readable medium storing a program executable by a processor to perform a method, the method comprising:
    receiving a training sample set in a current iteration of an object detection training process over an object detection neural network, the training sample set including first samples of a first class and second samples of a second class;
    determining a first center loss value of each of the first and second samples, the first center loss value being a distance between an eigenvector of the respective sample and a center eigenvector of the first or second class which the respective sample belongs to, the eigenvector of the respective sample being generated during the current iteration, the center eigenvector of the first or second class being derived based on the eigenvectors of the first samples or the second samples, respectively;
    determining a second center loss value of the training sample set according to the first center loss values of the first and second samples;
    determining a first target loss value of the current iteration according to the second center loss value of the training sample set; and
    outputting an object detection training result when the first target loss value of the current iteration reaches a convergence condition.

15. The non-transitory computer-readable medium according to claim 14, wherein the method further comprises:
    when the first target loss value of the current iteration does not reach the convergence condition, updating a network parameter of the object detection neural network according to the first target loss value of the current iteration.

16. The non-transitory computer-readable medium according to claim 14, wherein the determining the first target loss value comprises:
    determining the first target loss value according to the second center loss value, a first classification loss value, and a first object box coordinate regression loss value of the training sample set.

17. The non-transitory computer-readable medium according to claim 16, wherein the determining the first target loss value comprises:
    summing a product of the second center loss value of the training sample set and a first weight, a product of the first object box coordinate regression loss value of the training sample set and a second specified weight, and the first classification loss value of the training sample set to obtain the first target loss value of the object detection.

18. The non-transitory computer-readable medium according to claim 14, wherein the method further comprises:
    determining a second target loss value of each of the first and second samples in the training sample set;
    selecting a first number of the first samples that have maximum second target loss values among the first samples, and a second number of the second samples that have maximum second loss values among the second samples, a ratio of the first number to the second number being a predetermined ratio; and
    including the first number of the first samples and the second number of the second samples in an object detection training sample set for a next iteration of the object detection training process.

19. The non-transitory computer-readable medium according to claim 18, wherein the determining the second target loss value of each of the first and second samples in the training sample set comprises:
    determining a second classification loss value according to a predicted classification probability and a target classification probability of a third sample of the first and second samples;
    determining a second object box coordinate regression loss value according to predicted object box coordinates and target object box coordinates of the third sample; and
    determining the second target loss value of the third sample according to the first center loss value, the second classification loss value, and the second object box coordinate regression loss value of the third sample.

20. The non-transitory computer-readable medium according to claim 16, wherein the method further comprises:
    determining a second classification loss value of each of the first and second samples in the training sample set according to a predicted classification probability and a target classification probability of the respective sample; and determining the first classification loss value of the training sample set according to the second classification loss values of the first and second samples.

\* \* \* \* \*